US008711374B2

(12) United States Patent  
Oeters et al.

(10) Patent No.: US 8,711,374 B2
(45) Date of Patent: Apr. 29, 2014

(54) METHOD, APPARATUS, COMPUTER PROGRAM, AND COMPUTER READABLE STORAGE MEDIA FOR CONTROLLING THE INSERTION OF TAB SHEETS INTO A PRINT JOB

(75) Inventors: Christoph Oeters, Berlin (DE); Nusret Tasci, Berlin (DE)

(73) Assignee: Sofha GmbH Gesellschaft fur Soft-und Hardware, Berlin (DE)

( * ) Notice: Subject to any disclaimer, the term of this patent is extended or adjusted under 35 U.S.C. 154(b) by 548 days.

(21) Appl. No.: 12/715,321

(22) Filed: Mar. 1, 2010

(65) Prior Publication Data

US 2010/0272486 A1    Oct. 28, 2010

(30) Foreign Application Priority Data

Mar. 2, 2009 (DE) .......................... 10 2009 010 908

(51) Int. Cl.
    *G03G 15/00*    (2006.01)
(52) U.S. Cl.
    USPC ....... 358/1.13; 358/1.12; 358/1.16; 358/1.18; 358/1.9; 462/62; 462/63; 399/81; 399/85; 399/382
(58) Field of Classification Search
    USPC ............. 358/1.13, 474, 488, 1.18, 1.12, 1.16, 358/1.9; 399/81, 382, 85
    See application file for complete search history.

(56) References Cited

U.S. PATENT DOCUMENTS

| 6,782,218 | B2 * | 8/2004 | Sekiguchi et al. | 399/81 |
| 7,986,418 | B2 * | 7/2011 | Hoshino et al. | 358/1.13 |
| 8,218,191 | B2 * | 7/2012 | Sakuraba et al. | 358/1.18 |
| 2002/0131075 | A1 | 9/2002 | Kremer | |
| 2003/0214684 | A1 * | 11/2003 | Kuboki | 358/474 |
| 2003/0214685 | A1 * | 11/2003 | Suzuki | 358/488 |
| 2004/0005164 | A1 * | 1/2004 | Sugimoto | 399/81 |
| 2008/0197556 | A1 * | 8/2008 | Nakagawa et al. | 270/58.32 |
| 2010/0073728 | A1 * | 3/2010 | Moroney et al. | 358/1.18 |
| 2010/0188706 | A1 * | 7/2010 | Ray | 358/1.18 |

FOREIGN PATENT DOCUMENTS

| DE | 101 61 886 A1 | 8/2002 |
| EP | 1 291 814 A2 | 3/2003 |
| WO | WO 2004/013748 A2 | 2/2004 |

* cited by examiner

*Primary Examiner* — Allen H Nguyen
(74) *Attorney, Agent, or Firm* — Christie, Parker & Hale, LLP

(57) ABSTRACT

A method for controlling within a printer driver the insertion of tab sheets into a print job. According to one embodiment, sheets of multiple levels are insertable. The printer driver provides at least input fields for entry and display of parameters for the definition of at least one tab sheet, and an interactive area for visualizing the hierarchical structure and the order of the at least one defined tab sheet corresponding to the level of the tab sheet in the print job. Depending on changes of a tab sheet defined by entered parameters, the visualization of the hierarchical structure and the order of the at least one defined tab sheet in the print job is updated in the interactive area.

13 Claims, 5 Drawing Sheets

METHOD, APPARATUS, COMPUTER PROGRAM, AND COMPUTER READABLE STORAGE MEDIA FOR CONTROLLING THE INSERTION OF TAB SHEETS INTO A PRINT JOB

CROSS-REFERENCE TO RELATED APPLICATION

This application claims to and the benefit of German Patent Application Number 10 2009 010 908.0, filed on Mar. 2, 2009, the entire content of which is incorporated herein by reference.

AREA OF THE INVENTION

The invention covers a method and an apparatus for controlling the insertion of tab sheets into a print job, as well as a computer program and a related computer readable storage media which can control the insertion of tab sheets into a print job. Printout is performed on digital printers or copiers, and the printout is controlled by a printer driver. The invention supports in particular the insertion of different kinds of tab sheets, the assignment of tab sheets to hierarchy levels, and multiple insertions of tab sheets. Usability and safety of the printer driver is improved by a graphical representation of the tab sheets within the print job corresponding the user input. The graphical representation is adjusted on the fly, i.e. immediately after each user input of a particular setting.

TECHNICAL BACKGROUND

Conventional digital printers and copiers allow transmitting print jobs from a client PC over a network or other communication connections to such printer or copier. (In the following, the term "printer" shall be used for digital printers and digital copiers.) Professional printers allow the user selecting a multitude of settings, e.g. input tray, paper size, or finishing options. This selection is performed in a printer driver which is called when the user tries to submit a print job from an application on the client PC. Settings like the input tray can be selected for the whole print job or individually for each page. When the printer driver sends the print job to the printer, the data in the print job comprise also the instructions corresponding to the settings selected by the user.

The printer driver can be used, e.g., to insert, during printing, tab sheets between the normal pages of a print job. A tab sheet consists of a rectangular body and a protruding tab located at a specific, selectable position at one edge of the main body (see FIG. 1). A set of tab sheets consists of tab sheets whose tabs are located at the same edge of the main body, but at different locations. By this ordering of tabs, a print document can be structured by the inserted tab sheets. FIG. 1 shows a pile of paper with inserted tab sheets. Each tab sheet has a tab. The tabs are located at the edge of the tab sheet at different locations for easy identification. The positions of the tabs at the edge of the tab sheet correspond to their order in the pile of paper and thereby provide a structure to the pile of paper.

Tab sheets can be inserted additionally to the normal pages of the printed document, or instead of the normal pages of the printed document. In the first case, the tab sheet is called a blank tab sheet (also regular tab sheet, see FIG. 2), in the second case, the tab sheet is called a printed tab sheet (also bleed tab sheet, see FIG. 3). FIG. 2 shows a blank tab sheet. The main body of the blank tab sheet has no content. Only the tab is printed with text. FIG. 3 shows a printed tab sheet. On a printed tab sheet, the main body of the tab sheet is printed with the text or other content of the corresponding document page, whereas the tab is printed with the corresponding tab text.

If the print job requires more tab sheets than the sheets contained in one set of tab sheets (e.g. the job requires 10 tab sheets, but the set contains only 5), multiple sets of tab sheets can be used for such a print job. FIG. 4 shows the usage of multiple sets of tab sheets. If the number of required tab sheets exceeds the number of tab sheets in a set, a new set of tab sheets is inserted after the last sheet, starting again with the first sheet.

Such solutions are already in use, e.g. in printers of Konica Minolta Corp. or Xerox Corp.

Newer printers allow using in a single print job different kinds of tab sheets, e.g. with wide and small tabs, with different paper colors, or with different number of tabs per set of tab sheets. The different kinds of tab sheets can be used to express different tab levels and thereby a hierarchical structure within the print job. In order to avoid erroneous input, users expect that this structure, the order of the tab sheets, and their properties can be easily recognized and easily manipulated throughout the print system including the printer driver.

US patent application 2008/0030784 describes a printer driver with a user interface which allows a user inserting tab sheets from two different levels into a print job.

US patent application 2008/0175636 describes a printer driver by which conditions for the first and the second level of tab sheets can be determined. In both solutions, the user interface provides input fields, but no graphical visualization of the structure of the print job resulting from the user input, showing the relation between the document pages and the tab sheets in an overview. Therefore both solutions have a potential for user errors.

US patent application US 2002/0131075 A1 supports the permanent management of information about tab sheets in documents. For this purpose, markers are written into the document which are read back later. I.e. the document is used as a permanent storage for information about tab sheets. This method cannot be applied in a printer driver because of its interface with the operating system. Because of this interface, documents are always newly created in the actual printing task and the documents created this way contain no structure except the sequence of pages.

The patent application further describes different usages of tab sheets (regular tabs and bleed tabs). These correspond to blank tab sheets and printed tab sheets, i.e. different ways to print on a tab sheet. They are not directly related to physically different types of tab sheets. Further, these usages are not (or much less than physically different kinds) suited to express different levels of tab sheets and thereby a hierarchical structure. The patent application shows also the display of a document hierarchy. However, this display is related to the hierarchy of different documents, not the hierarchy of tab sheets. For tab sheets, only a textual, not a hierarchically structured display of their properties is provided.

The European patent application EP 1 291 814 A2 supports the management of media (paper type and paper size) in a media catalogue. This includes determination of a subset of the media catalogue to ease the media selection. Tab sheets are supported as media types, however, there is no specific support for showing the hierarchy, kind, or order of tab sheets.

The patent application WO 2004/013748 A2 describes a method for applying finishing commands to ranges and sub-ranges within a print file, where an accompanying control file defines a level structure corresponding to the ranges and subranges in the print file. These informations can be generated e.g. from a database, in parallel to the creation of the print job. This solution is not applicable within a printer driver, because it requires that besides the print file there is structural information about this file (the ranges and subranges). However, due to the interface of the printer driver with the operating system, such information is not accessible within a printer driver.

The known solutions have the disadvantage that a hierarchical structure corresponding to the different levels of tab sheets either cannot be represented at all, or requires the document structure which however, is not available in a printer driver due to its interface with the operating system.

Further the known solutions have the disadvantage that they cannot implement all possible variants of inserting tab sheets. E.g. it is not possible to insert multiple tab sheets (of one level) directly before or directly after a normal sheet of the print job. Further the solutions do not allow inserting tab sheets both before and after a document page in a print job. Further the solutions are error prone due to the lacking overview in their user interface.

TASK OF THE INVENTION

The present invention therefore has the task to provide a method and apparatus for controlling the insertion of tab sheets into a print job, as well as a corresponding computer program and corresponding computer readable storage media, which lift the mentioned disadvantages and allow increasing the number of application cases which can be controlled via the user interface of the printer driver.

I.e. the solution shall allow that the hierarchical structure, the order of the tab sheets, and their properties can be easily manipulated and easily recognized in the printer driver, further that all cases which can be implemented by the printer engine hardware, in particular multiple insertions before and after a document sheet, can be easily manipulated and easily recognized.

DESCRIPTION OF THE INVENTION AND ITS ADVANTAGES

A particular advantage of the invention is its property that a user initiating a print job where he wishes to insert tab sheets of different levels gets visual information about the structure of the print job during its configuration. Here structure means the hierarchical ordering of document pages and tab sheets of the different levels. As the structure of the document to be printed is not available in the printer driver due to its interface to the operating system, according to the invention the structure of the document pages and the tab sheets is reconstructed from the user's input. The hierarchical structure is clearly illustrated by the visual representation. This makes it possible to improve the usability, ease the error recognition, and avoid erroneous input.

This is achieved in the invention by the printer driver providing a graphical user interface for controlling the insertion of tab sheets into a print job. This user interface comprises a window with an interactive area in which the hierarchical structure of the tab sheets and the pages of the print job is graphically visualized. Specifically, according to the invention the whole structure is shown in a single (scrollable) window. Using this graphical visualization, the users gets a quick and general overview over the document pages and the inserted tab sheets and thereby can make corrections quickly if necessary.

Further, the user interface provides input fields for parameters by which the properties of the tab sheets can be defined. Such properties may be e.g. the number of pages, the print mode, the insert mode, the number of tab sheets to be inserted, the tab type, the tab position, the text to be printed on the tab, etc. According to the parameter values entered for a tab sheet, the graphical display in the windows is updated and the position of the tab sheet with respect to the document pages and tab levels is shown. This is done on the fly during parameter input. This improves not only the easy recognition, but also the easy manipulation of the tab sheets.

The hierarchical order of the document pages and the tab sheets in a print job is shown graphically by means of graphical elements, e.g. icons in the user interface window. For the better visualization of the hierarchical structure of the print job, in a preferred embodiment, the graphical elements are connected by connection icons corresponding to their position in the print job hierarchy In a preferred embodiment of the invention the interactive window is divided into rows and columns. The rows and columns correspond to parameters of document pages and/or tab sheets. E.g. the rows may represent the order of the sheets (document pages and/or tab sheets). The columns may represent the page number of the respective page, its usage (document page or printed tab sheet), or the distinction between document page, first level tab sheet, or second level tab sheet. By preference, parts of the interactive window, e.g. (part of) the rows, or the graphical elements, are implemented as interactive areas. In this case, if the interactive area is clicked using a mouse or other pointing device, a tab sheet can be defined or changed for the position pointed to. Following the definition or change, the visualization of the hierarchical structure in the interactive window is updated. Using this visualization, the overview of the structure and the order of the tab sheets is shown using a minimum of elements.

In the preferred embodiment, besides the interactive window a further window is provided in which a scalable representation of the tab is shown together with the actual tab text as it will appear on the real printout. It should be emphasized that the invention allows selecting a single tab sheet in the printer driver user interface and define its properties individually. In particular, contrary to the conventional solutions, multiple tab sheets of a single level can be inserted before or after a document page or a tab sheet of another level. Further, blank tab sheets as well as printed tab sheets can be defined on the same level. Thereby, according to the invention, all cases which can be implemented by the printer engine hardware, can be easily manipulated and easily recognized.

In a preferred embodiment of the invention, an object oriented user interface shall be applied. Further, specific areas are associated to objects of an object oriented program. By choosing an area of the interactive window, the user then chooses the assigned object and activates the input fields by which operations applicable to this object are controlled. Input fields with non-applicable functions are usually deactivated and marked correspondingly.

An apparatus according to the invention consists of at least of a computer with a graphical user interface and at least a printer (black/white printer or color printer), where the computer and/or the printer comprise at least a chip and/or processor, and the apparatus is configured such that a method for controlling the insertion of tab sheets into a print job can be executed within a printer driver, where tab sheets of multiple levels can be inserted, and where the printer driver provides a user interface which at least provides input fields for entry and display of parameters for the definition of at least one tab sheet, provides an interactive area for visualizing the hierarchical structure and the order of the at least one defined tab sheet corresponding to the level of the tab sheet in the print job, and where depending on changes of a tab sheet defined by entered parameters, the visualization of the hierarchical structure and the order of the at least one defined tab sheet in the print job is updated in the interactive area.

A computer program for controlling the insertion of tab sheets into a print job enables a computer, after it has been loaded into the computer memory, to insert tab sheets into a print job within a printer driver, where tab sheets of multiple levels can be inserted, and where the printer driver provides a user interface which at least provides input fields for entry and display of parameters for the definition of at least one tab sheet, provides an interactive area for visualizing the hierarchical structure and the order of the at least one defined tab sheet corresponding to the level of the tab sheet in the print job, and where depending on changes of a tab sheet defined by entered parameters, the visualization of the hierarchical structure and the order of the at least one defined tab sheet in the print job is updated in the interactive area.

In a further preferred embodiment of the invention, the computer program according to the invention is constructed out of modules, where individual modules are installed on different computers.

Other embodiments provide additional computer programs by which further steps or workflows listed in the description can be executed. Such computer programs can be provided, e.g. downloadable in a data or communication network (against charge or free, freely accessible or password protected). The computer programs provided this way can then be made usable by a method where a computer program according to claim 9 is downloaded from an electronic data network, e.g. the Internet to a computer connected to the data network.

To execute the method for controlling the insertion of tab sheets into a print job according to the present invention, a computer readable storage medium shall be used on which a program is stored which enables a computer, after it has been loaded into computer memory, to execute a program for controlling the insertion of tab sheets into a print job within a printer driver, where tab sheets of multiple levels can be inserted, and where the printer driver provides a user interface which at least provides input fields for entry and display of parameters for the definition of at least one tab sheet, provides an interactive area for visualizing the hierarchical structure and the order of the at least one defined tab sheet corresponding to the level of the tab sheet in the print job, and where depending on changes of a tab sheet defined by entered parameters, the visualization of the hierarchical structure and the order of the at least one defined tab sheet in the print job is updated in the interactive area.

The present invention defines a data model for tab sheets which enables the management of tab sheets of different levels and the insertion of multiple tab sheets at one position of the print job. Further, the invention provides a graphical representation of the hierarchical order of the tab sheets within a print job which the user chooses during the configuration of the print job.

The arrangement of graphical elements in the graphical representation is generated or updated according to the user input during the configuration of the print job. The generation or update is performed on the fly. The invention further provides an interactive, graphical, object oriented user interface which allows the user entering the properties of tab sheets and simultaneously checking the expected print result in a graphical visualization. The invention thereby increases the usability, the predictability, and the operating safety and decreases the likelihood of errors.

The hierarchical structure of a print job is not available in a printer driver due to its interface with the operating system. Instead a print job consists of a simple non-structured sequence of pages.

Contrary to the conventional printer driver based solutions which show only the assignment of page numbers to tab sheets and the inscriptions, the invention visualizes the hierarchical structure and the order of the tab sheets in their context. In particular, the connection of tab sheets of different levels is handled programmatically by using the information about the level of the tab sheets for displaying the structure information.

This approach has the following advantages:

The structure can be entered directly according to the user's view, in particular with the connection of the different tab sheet levels.

More application cases can be entered directly, instead of by multiple steps, e.g. changing the level of a tab sheet, changing "insert before" to "insert after".

Details about different tab sheets, e.g. the tab text, can be displayed with minimal user input, often by a single click, in particular without opening a separate dialog. The allows checking the tab sheets by simple stepping through.

Input and changes cause direct visual feedback.

The user's working efficiency is increased.

Errors are avoided.

The realization is technically demanding because the structure of the original document is not available in the printer driver due to the interface with the operating system, and it must be possible to visualize many tab sheets in combination.

For this purpose, the following measures were taken:

The structure of the document pages and of the tab sheets is reconstructed from the user's input.

The display of pages is reduced to the pages which are essential for the structure: Pages without tab sheets are not shown.

A schematic display with rows and columns is used showing the hierarchy and the order of the tab sheets concisely and uniquely.

An object oriented user interface is used to enable or disable applicable operations. Depending on the selected object (by choosing the respective row in the interactive window) the applicable operations are activated or deactivated. In other words: If the user selects a row of the interactive window (corresponding to a document page or a tab sheet), the applicable operations are either offered as active or deactivated by "greying out".

A scrollable interactive window is used inside the (fixed size) dialog to show an arbitrary number of tab sheets.

The hierarchy entered by the user is mapped on printer instructions needed to output this hierarchy.

EXECUTION EXAMPLE

In the following, the invention will be illustrated using an execution example.

Figure 1:
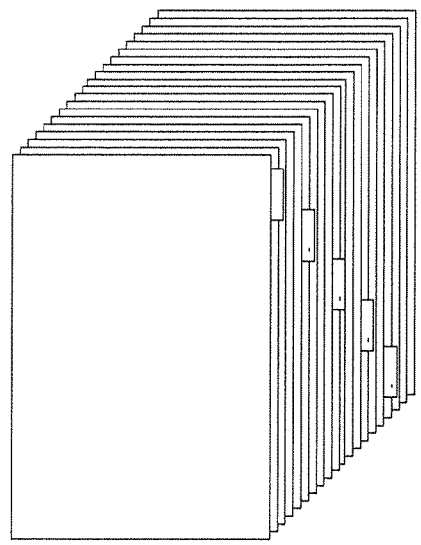
FIG. 1 shows a pile of paper with inserted tab sheets.
Figure 2:
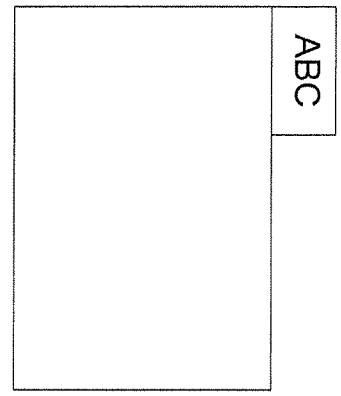
FIG. 2 shows an empty tab sheet.
Figure 3:
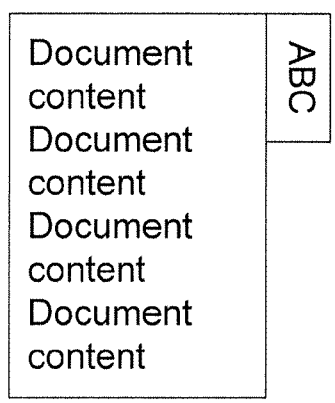
FIG. 3 shows a printed tab sheet.
Figure 4:
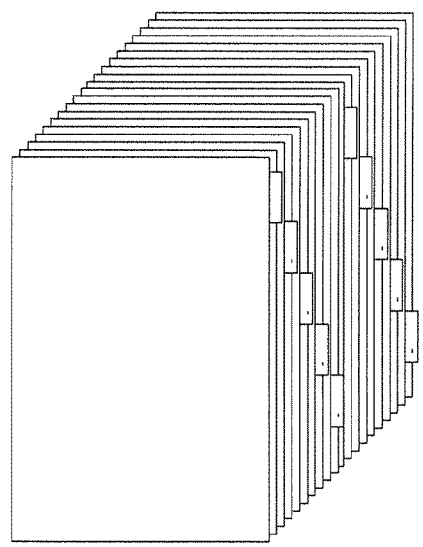
FIG. 4 shows the usage of multiple sets of tab sheets.
Figure 5:
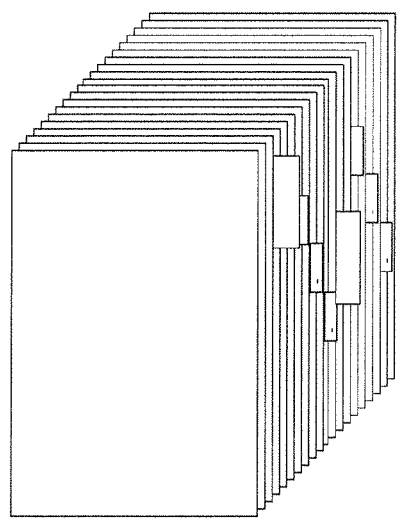
FIG. 5 shows the usage of tab sheets with two different levels.

In this execution example, a PC is connected to a printer, e.g. a network printer which can draw sheets from different trays. In particular, during a single print job, the printer can draw tab sheets from at least two different trays, corresponding to two levels of tab sheets, in addition to the tray from which the sheets for the normal document pages are drawn. FIG. 5 shows the usage of tab sheets of different levels. It shows a pile of paper, into which tab sheets of different levels have been inserted. Tab sheets with wide tabs represent tab sheets of the main level, called level 1. The small tabs represent a subordinate level, called level 2. On the PC, applications are installed by which the user can create documents. Further, the PC provides a printer driver by which the documents can be converted into a page description language and then sent to the printer. The printer driver can insert commands into the page description language which can call various printer functions like insertion of tab sheets before or after a given page of the document.

Data Model

In the following, a sample data model shall be described:

When a print job is started by an application on a user PC, document pages are created. Tab sheets can be assigned to individual document pages. The following attributes can be assigned to those tab sheets:

the page number within the document, the print mode, i.e. whether the document page shall be printed as regular page (print on body) and/or as tab sheet (print on tab), the insert mode: off, before, or after, number of tab sheets to be inserted, tab text, tab position.

If 'before' or 'after' was selected as insert mode (but not 'off'), additional pages are inserted as tab sheets. The sheets to be inserted can have the following attributes:

tab sheet level, tab text, tab position.

In this sample embodiment, a first and a second level can be selected as tab sheet level.

Figure 6:
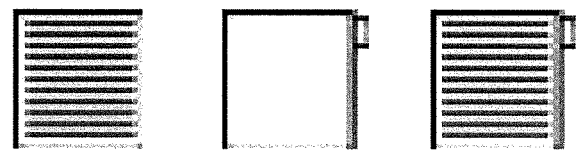
FIG. 6 shows icons by which pages can be shown in a graphical representation in the user interface of the printer driver.

According to these attributes the structure of the respective print job is visualized in a graphical representation within the printer driver user interface. This automatically created graphic comprises the following elements:

Icons for pages, where there are specific icons for printed document pages, printed tab sheets, and blank tab sheets. FIG. 6 shows icons for visualizing pages in the graphical display. In particular, FIG. 6 shows icons for a printed document page, a blank tab sheet, and a printed tab sheet. Icons for printed document pages schematically exhibit a printed area on the sheet body but do not have a tab. Icons for printed tab sheets exhibit a printed area on the sheet body and have a tab, while icons for blank tab sheets exhibit an empty sheet body with a tab.

Figure 7:
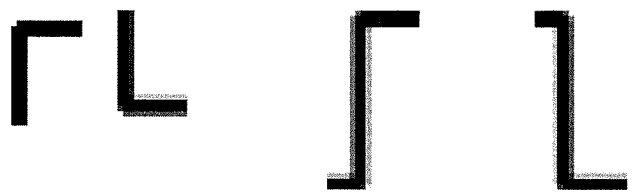
FIG. 7 shows sample connection icons.

The graphical representation further comprises connection icons (see FIG. 7). E.g. four connection icons are used.

connector to a preceding document page, connector to a subsequent document page, connector to a preceding tab sheet and connector to a subsequent tab sheet.

In FIG. 7, sample connector icons are shown. In particular, FIG. 7 shows a connector icon to a preceding page and a connector icon to a subsequent page as well as connector icons to a preceding and a subsequent tab sheet.

Figure 12:
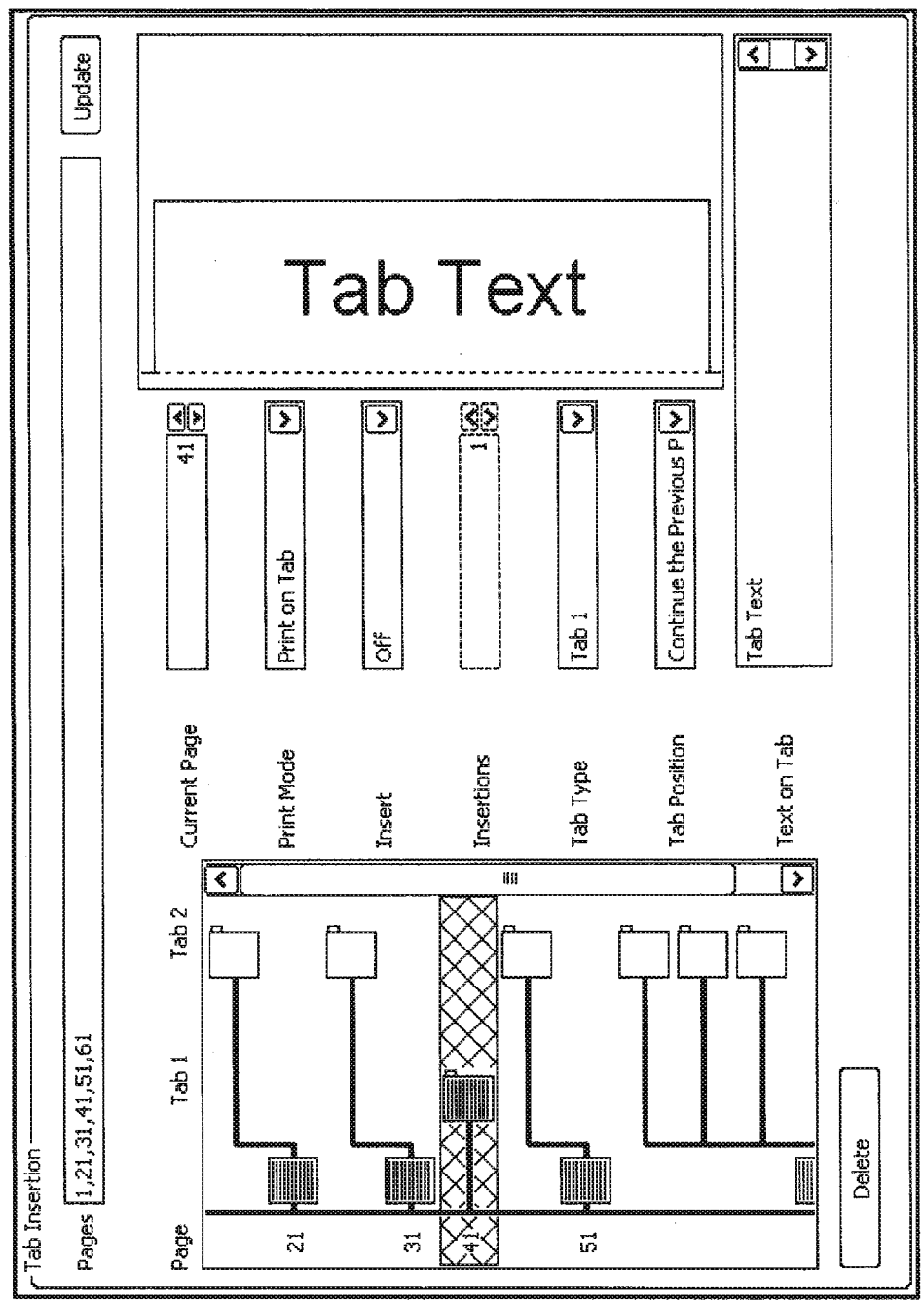
FIG. 12 shows a sample representation of the complete user interface of a printer driver.

Design of the Graphical Representation:

In this sample embodiment, the graphical representation is part of the printer driver user interface (see FIG. 12). In the graphic, the hierarchy of the tab sheets is shown in a window of the printer driver's graphical user interface. A number of input fields are arranged adjacent to this window where the user can enter parameters for the configuration of the print job, in particular parameters which cause tab sheets to be inserted in the print job. Further, the graphical user interface of the sample printer driver contains a window where the tab with the entered text is shown.

The representation of the hierarchy of the tab sheets within the print job can be scrolled vertically. This enables the user to insert a large number of tab sheets and to check their order within the print job in the graphical representation, even if the number of inserted tab sheets exceeds the display space of the graphical display window.

The window of the graphical representation of the hierarchic order of the tab sheets is structured into four columns in the sample embodiment:

A first column for the page number display, a second column for the representation of the icons for normal document pages, a third column for the representation of the icons for level 1 tab sheets and a fourth column for the representation of the icons for level 2 tab sheets. By this separation, the user receives an immediate impression of which level each page of the print job (normal document pages or tab sheets) is assigned to (normal, level 1 or level 2). The representation of the hierarchy of the tab sheets is divided further into single rows. Each row is assigned to exactly one page which may be a tab sheet or a normal document page. By means of this row order, the sequence of the normal pages and the tab sheets in the printout is clarified.

Figure 8:
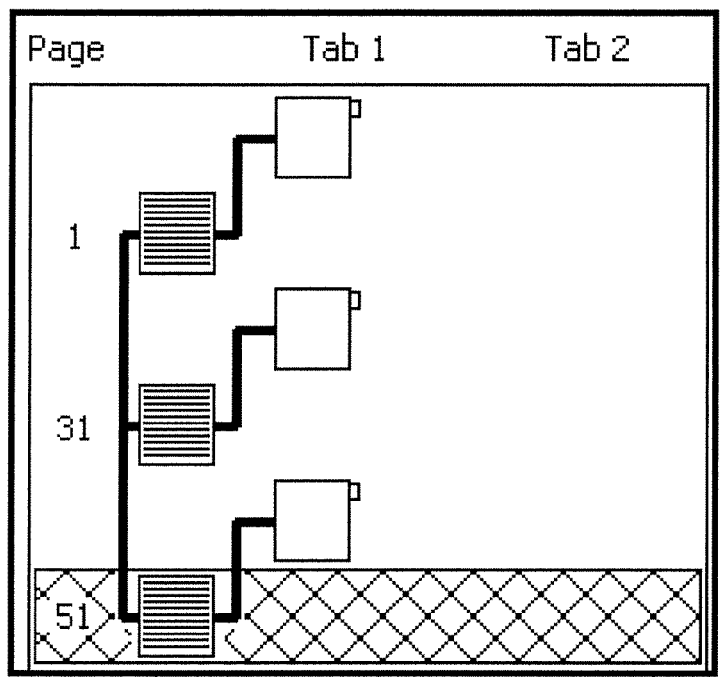
FIG. 8 shows a sample graphical representation of the hierarchical structure of the tab sheets within a print job.
Figure 9:
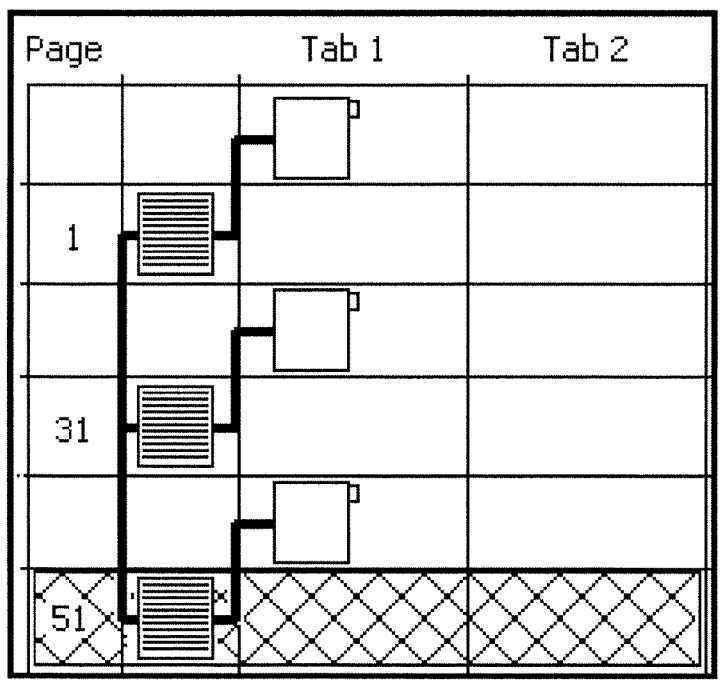
FIG. 9 shows a sample graphical representation of the hierarchical structure of the tab sheets within the print job, emphasizing the matrix structure of rows and columns.
Figure 10:
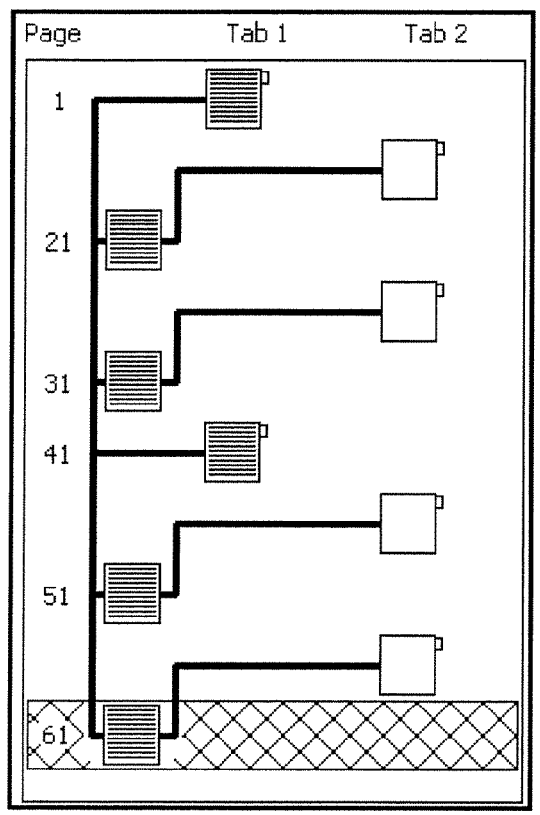
FIG. 10 shows a more complex representation of the hierarchical order of the tab sheets.

FIGS. 8 to 10 illustrate this segmentation of the graphical representation of the hierarchy of the tab sheets. FIG. 8 shows a column with row numbers, an unlabeled column with three icons for document pages and a third column with icons for level 1 tab sheets. FIG. 8 shows a sample graphical representation of the hierarchical structure of the tab sheets within a print job. In particular, FIG. 8 shows blank tab sheets of level 1 inserted before document pages 1, 31 and 51. The row of document page 51 is optically emphasized to point out that for this page properties can be defined using input fields of the printer driver user interface. FIG. 9 shows the graphical representation of the hierarchical arrangement of the tab sheets within the print job with emphasis of the underlying matrix structure of rows and columns. FIG. 10 shows a column with row numbers, an unlabeled column with four icons for document pages, a third column with two icons for tab sheets of level 1, and a fourth column with four icons for tab sheets of level 2. FIG. 10 shows a more complex representation of the hierarchical arrangement of tab sheets within a print job. For pages 1 and 41, printed tab sheets of level 1 are shown, and for pages 21, 31, 51 and 61, blank tab sheets are shown which are inserted before the respective document pages. As one can see, each row only contains exactly one icon. The order of the sheets in the successive rows reflects the order in the printed main document.

As can be seen from the description above, specific icons are used for the different sheets. Normal pages of the document, blank tab sheets, and printed tab sheets each have a specific icon (see FIG. 6). The rows in the graphical representation match the sequence of the sheets in the document eventually printed, and the columns represent the hierarchy of the pages: normal document page, tab sheet of level 1, and tab sheet of level 2. The icons of the particular pages are shown in the respective positions given by rows and columns according to their attributes, which were assigned to the pages by the input fields provided in the user interface. To avoid a degradation of the usability of the printer driver by showing unnecessary information, document pages without assigned tab sheets are not displayed in the graphic representation window. Thereby the user receives a clear overview about the structure of the print job and is not confused by unnecessary information.

Page numbers are assigned to each page that contains text or other content of the job to be printed. These may be normal document pages, but also printed tab sheets.

The icons displayed in the window are connected by the connector icons in a way, that their order within the document and their relation to the regular document pages is illustrated. To illustrate that all document pages belong to the same document, the icons of the document pages are connected by connector icons. Blank tab sheets are connected to their assigned document page using the connector icons. This document page can be a normal page or a printed tab sheet. If a blank tab sheet shall be inserted before a document page, the blank tab sheet is arranged into the row above the row of the document page, and the connector icon runs from the document page in the subsequent row to the blank tab sheet in the row above. (See e.g. assignment of the blank tab sheet to the document page 31 in FIG. 9 or 10.) If a blank tab sheet is inserted after a document page, the icon of the blank tab sheet is inserted in the row below the icon of the regular document page to which it is assigned. Accordingly, the connector icon runs from the icon of the document page to the icon of the blank tab sheet in the row below.

After every entry into the input fields of the printer driver user interface, the representation of the arrangement or respectively the relations of the tab sheets within the print job is updated.

If it is not possible to fully display the whole document structure within the window for the graphic representation, a slider is shown at the window border which allows to scroll the graphic representation of the document structure inside the window.

Insertion and Manipulation of Tab Sheets

FIG. 12 is the display of a sample full-feature user interface of a printer driver. In the upper part of the user interface, there is a field to enter page numbers of document pages to which tab sheets shall be assigned. On the left part of the sample user interface, there is a window, in which the graphic representation of the hierarchical structure of the tab sheets is shown. As the whole structure cannot be shown within the window, as can be seen in FIG. 12, a slider is shown at the edge of the window by which the invisible parts of the structure can be moved into the window range. The middle part of the sample user interface comprises input fields to input or change page numbers, print mode, insert mode, number of tab sheets to insert, tab sheet level, tab position, and the text to be printed on the tab. The values entered in the input fields are automatically assigned to the page that was selected in the graphic representation (here: p. 41). The sample user interface is implemented as object-oriented user interface, i.e. according to the page selected in the graphic representation input fields can be activated or deactivated.

After initiation of a print job, the user interface of the printer driver is displayed on the graphical user interface of the computer. From the start there are no tab sheets. If a user wants to insert tab sheets into the print job, he is able in a sample embodiment of the user interface of the printer driver to enter page numbers for those document pages to which a tab sheet shall be assigned. After confirmation of this entry the window with the graphical representation of the arrangement of the tab sheets is updated and now shows the entered page numbers in column 1 and for every entered page number an icon for one document page in column 2.

In this representation the user can select a row to define the respective tab sheet. By preference, the selected row is optically emphasized, and simultaneously the input fields of the printer driver are automatically linked to the data structure which defines the tab sheet assigned to the selected document page. Via the input fields e.g. the print mode, the insert mode, the numbers of tab sheets to be inserted, the level of the tab sheet, the tab position, the tab text, and other items can be defined. According to the entries in these input fields, the graphic representation of the hierarchy of the tab sheets within the print job is adapted immediately (on the fly).

Settings already made can be changed afterwards. E.g. the user can change the set of page numbers to which a tab sheet shall be assigned. After confirmation of this input the graphical representation is updated, and the new structure is shown. For newly inserted page numbers a document page with the respective page number is inserted into the graphical representation for which afterwards the corresponding tab sheet can be defined. Rows with document pages respectively tab sheets corresponding to page numbers deleted from the original list are removed from the graphical representation.

To define the corresponding tab sheet for a document page, the row of the corresponding document page is selected by the user. If necessary, the representation of the document structure has to be moved using the slider to show the desired row in the window of the graphic representation. Afterwards, the user can define the corresponding tab sheet/sheets via input into the input fields. If a blank tab sheet shall defined for the selected document page, a new row is inserted into the graphical representation. The new row is inserted above the row with the icon for the document row if the blank tab sheet shall be inserted before the document page, otherwise the new row is inserted below the row with the icon for the document page. Preferably the user interface of the printer driver is implemented as object-oriented user interface. In particular provision is made that on selection of the kind of the tab sheet input fields for the corresponding parameters are activated and others are deactivated. If for example a tab sheet is determined as printed tab sheet, the input field for the number of tab sheets to be inserted is deactivated, because a printed tab sheet cannot be inserted multiple times. Only blank tab sheets can be inserted multiple times.

For regular document pages the following attributes can be defined: page number, print mode, insert mode, number of pages to be inserted before or after a normal document page (if the insert mode was not set to 'off').

For printed tab sheets the following attributes can be set: page number, print mode, insert mode, number of pages to be inserted before or after a normal document page (if the insert mode was not set to 'off'), tab type, tab position, text to be printed on the tab.

For blank tab sheets the following attributes can be set: tab type, tab position, text to be printed on the tab.

For blank tab sheets the following attributes can be set: tab type, tab position, text to be printed on the tab.

The illustration in the window with the representation of the tab sheet hierarchy within the print job is changed by following inputs:

Changing a page number causes the page number in the first column of the selected row to be updated.

Figure 11:
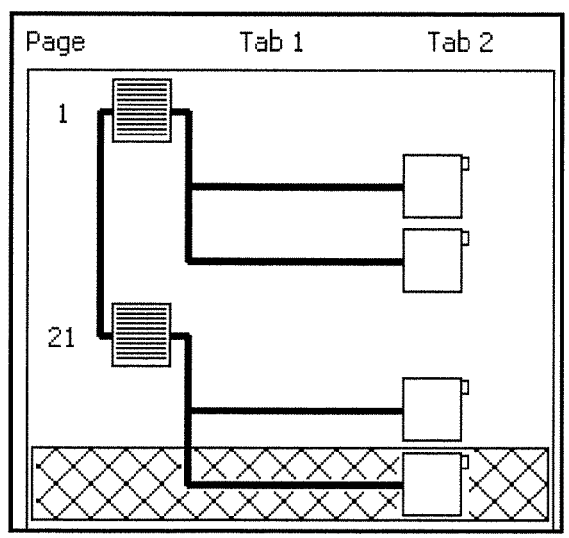
FIG. 11 shows a sample graphical representation of the hierarchical structure of the tab sheets where multiple blank tab sheets of level 2 are inserted

Changing the print mode causes the selected page to be updated as regular document page if the print mode was 'print on body'. If the print mode was 'print on tab', the selected page is displayed as a printed tab sheet. Changing the insert mode causes the removal of the rows before or after the normal document page if the value of the insert mode was changed from 'before' or 'after' to 'off'. On the other hand, if the insert value is changed from 'off' to 'before' or 'after', a new row before or after the selected document page is inserted, containing an icon for a blank tab sheet. The number of rows to be inserted in not limited to one, but several rows can be inserted depending on the number of tab sheets to be inserted (multiple insertions). FIG. 11 illustrates a sample representation of the hierarchical tab sheet structure within a print job in the case that after pages 1 and 21 several tab sheets of level 2 are inserted. Moreover, the visualization of the blank tab sheet depends on the kind of the tab and/or the level of the tab sheet.

If the parameter of the insert mode is changed from 'before' to 'after' or from 'after' to 'before', the original row of the selected tab sheet is deleted and re-inserted after (before) the corresponding document page and the respective connector icons are adapted. No further adaptions are executed when changes apply to the parameters 'before' or 'after'.

A change in the number of tab sheets to be inserted causes rows with icons for blank tab sheets to be inserted when the number of tab sheets is increased, and the newly inserted tab sheets to be linked to the corresponding document page via connector icons. A decrease of the number of tab sheets to be inserted accordingly causes rows with blank tab sheets linked to the corresponding document page to be deleted.

Changing the level of the tab sheet causes the selected page, which can be a printed or a blank tab sheet, to be deleted from the column that represents the original level and re-inserted in the column representing the new level.

If the complete representation of the sheet sequence and the hierarchy of the tab sheets within the print job cannot be displayed in the window for the graphical representation, only a part of the structure is shown and a slider is shown at the edge of the window, enabling to scroll the graphical representation of the job's hierarchical structure for making the desired pages of the print job visible.

In a further embodiment all tab sheets of the same level can be selected by clicking on their column to change a property for them all, e.g. to change the insert mode from 'before' to 'after'.

The invention is not limited in its embodiment to the preferred execution examples mentioned above. Rather a number of variants can be envisioned which use the set-up and method of the invention even with basically different embodiments.

The invention claimed is:

1. A method for controlling, within a printer driver, insertion of tab sheets into a print job, the tab sheets comprising at least tab sheets of a first level of a hierarchy and tab sheets of a second level of the hierarchy, where the at least first and second level define a hierarchical structure, and wherein the at least one second level is subordinated to the first level, the method comprising:
   providing via the printer driver input fields for entry and display of parameters for defining at least one tab sheet;
   providing via the printer driver an interactive area for displaying an image representation of the first level and the at least one second level of the hierarchical structure including an insertion position and the level of the at least one defined tab sheet within the print job, the image representation comprising:
   at least one icon or number representing a page of the print job;
   at least one icon representing a tab sheet;
   at least one connector icon associating the icon representing the tab sheet with the icon or number representing the page;
   wherein, a first column of the interactive area displays the at least one icon or number representing the page, second and third columns of the interactive area respectively display the at least one icon representing a tab sheet of the first level, and the at least one icon representing a tab sheet of the at least one second level,
   wherein, the connector icon associates the icon or number representing the page, with the icon of the tab sheet which is assigned to the page of the connected icon, and
   wherein, arrangement of the at least one icon or number representing the page, and the at least one icon representing the tab sheet within the image representation, are configured to indicate the insertion position and level of the tab sheet within the print job; and
   in response to changes of a tab sheet defined by entered parameters, updating in the interactive area the image representation of the hierarchical structure, of the insertion position and level of the at least one changed tab sheet within the print job.

2. The method according to claim 1, wherein depending on the definition of a tab sheet by entered parameters, input fields associated with the tab sheet are activated and input fields not associated with the tab sheet are deactivated.

3. The method according to claim 1, wherein the interactive area is structured into rows and the first, second, and third columns, at least one of the rows and columns being assigned to properties of the tab sheets of the print job, wherein the icons are arranged within the rows and columns according to the properties of document pages or tab sheets represented by the icons.

4. The method according to claim 1, wherein parts of the interactive area are configured to display objects of an object oriented program, wherein selection of a part of the interactive area activates corresponding input fields for controlling operations applicable to the object.

5. The method according to claim 1, wherein a user interface for a selected tab sheet provides an input field for entering a tab text for the tab sheet.

6. The method according to claim 1 wherein a user interface for a selected tab sheet provides an input field for entering a number of instances to be inserted for the tab sheet.

7. A printer system comprising:
   at least one data processing unit; and
   a printer coupled for communication with the computer, wherein the at least one data processing unit is configured to execute computer program instructions for controlling insertion of tab sheets into a print job according to the method of claim 1.

8. A non-transitory computer readable storage media on which a program is stored for execution by a computer, after it has been loaded into a memory of the computer, the program adapting the computer to control insertion of tab sheets into a print job according to the method of claim 1.

9. The method of claim 1, wherein a size of a tab of a tab sheet varies depending on the level of the tab sheet.

10. The method of claim 1, wherein at least one of the parameters define an insert mode of the at least one tab sheet as before or after a particular page of the print job, wherein the interactive area displays the tab sheet in relation to the particular page.

11. The method of claim 1, wherein a level for the at least one tab sheet is selectable by the entered parameters.

12. The method of claim 1, wherein parameters are defined for a first tab sheet and a second tab sheet to be inserted in the print job, wherein the first tab sheet is configured to be inserted in the insertion sequence in the print job according to the first level, and the second tab sheet is configured to be inserted in the insertion sequence in the print job according to the second level.

13. The method of claim 12, wherein the first tab sheet associated with the first level is bigger than the second tab sheet associated with the second level.

* * * * *